Figure 1:
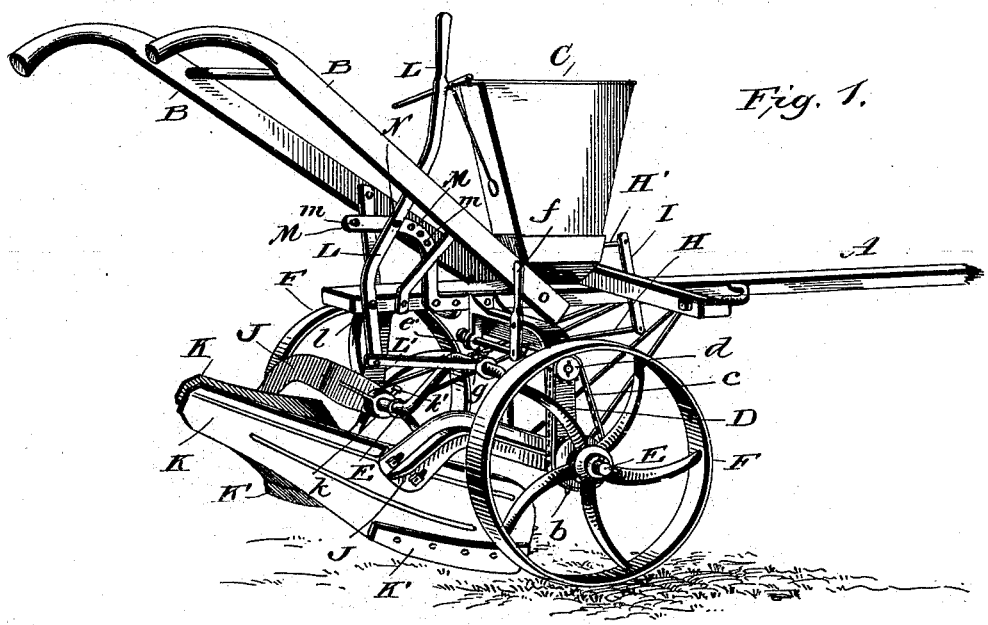

(No Model.)

F. M. HAINES.
HORSE HOE AND FERTILIZER DISTRIBUTER.

No. 509,468. Patented Nov. 28, 1893.

Witnesses
L. C. Hill.
E. S. Trull.

Inventor
Fred M. Haines,
by Franklin H. Hough,
Attorney

THE NATIONAL LITHOGRAPHING COMPANY,
WASHINGTON, D. C.

UNITED STATES PATENT OFFICE.

FRED M. HAINES, OF FORT FAIRFIELD, MAINE.

HORSE-HOE AND FERTILIZER-DISTRIBUTER.

SPECIFICATION forming part of Letters Patent No. 509,468, dated November 28, 1893.

Application filed June 20, 1893. Serial No. 478,218. (No model.)

*To all whom it may concern:*

Be it known that I, FRED M. HAINES, a citizen of the United States, residing at Fort Fairfield, in the county of Aroostook and State of Maine, have invented certain new and useful Improvements in Horse-Hoes and Fertilizer-Distributers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in agricultural implements of that class embodying a fertilizer distributer and a hoe and it has for its objects among others to provide a simple and cheap device of this character which shall be better adapted for the purposes for which it is intended, and capable of better work with little or no attention on the part of the operator. I provide a crank axle carrying the wheels one of which carries a sprocket wheel around which passes a sprocket chain which passes around a smaller sprocket wheel which is provided with a slot in which is designed to engage a part on one end of an endwise-movable shaft which is connected with the dropper slide to actuate the same. The wings are carried by the crank axle on which they are adjustable and means are provided for gaging the wings to go any desired depth and when not in use they can be lifted clear of the ground.

Other objects and advantages of the invention will hereinafter appear and the novel features thereof will be specifically defined by the appended claims.

The invention in the present instance resides in the peculiar combinations, and the construction, arrangement and adaptation of parts, all as more fully hereinafter described, shown in the drawings and then particularly pointed out in the claims.

The invention is clearly illustrated in the accompanying drawings, which, with the letters of reference marked thereon, form a part of this specification, and in which—

Figure 2:
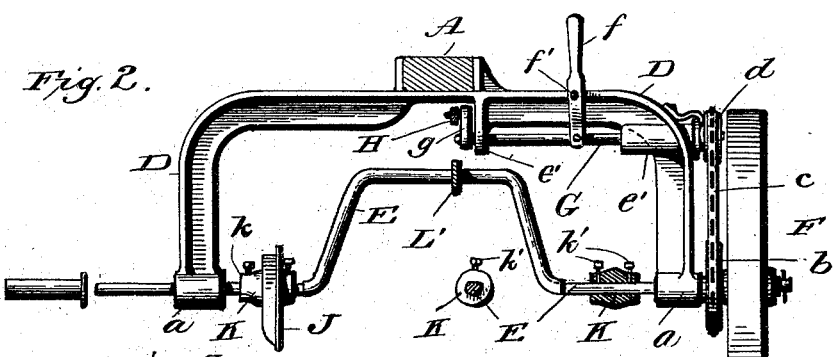
Figure 3:
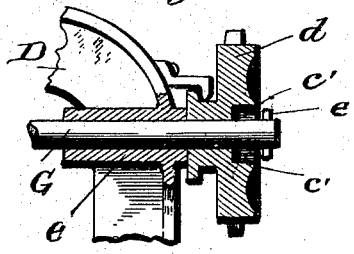
Figure 4:
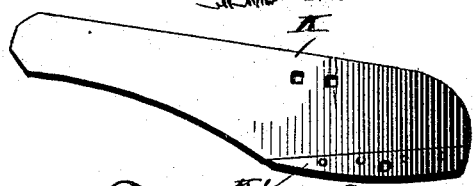

Figure 1 is a perspective view of my improved agricultural implement. Fig. 2 is a rear view thereof, partly in section and with parts omitted. Fig. 3 is a detail showing the endwise-movable shaft and its connection with the sprocket wheel. Fig. 4 is a detail showing one of the wings with its detachable acting portion.

Like letters of reference indicate like parts throughout the several views.

Referring now to the details of the drawings by letter, A designates the pole or tongue, B the handles, C the hopper and D the frame all of which may be of any suitable construction.

E is a crank axle supported in bearings at $a$ in the frame, and on the ends of this axle are the wheels F. These wheels may be of any suitable form and construction except as hereinafter specified. On the hub of one of the wheels, preferably that on the right side of the machine, is fast a sprocket wheel $b$ around which passes a sprocket chain $c$ which passes also over a smaller sprocket wheel $d$ which is carried by a stud shaft G on the frame D and the said shaft or the hub of the wheel has a slot $c'$ as shown into which is designed to be engaged a spline or analogous device $e$ on one end of the shaft G which is mounted to slide in the direction of its length in suitable bearings $e'$ on the frame as shown and on this shaft or rod is a lever or handle $f$ which is pivoted as at $f'$ to the frame and the manipulation of which lever throws the shaft or rod into or out of engagement with the slot so that the shaft or rod will or will not revolve with the sprocket wheel $d$ as will be readily understood. On the other end of this endwise-movable shaft is a crank arm $g$ to which is connected an arm or link H and to this link or arm is pivotally connected the rod I which is pivoted to the tongue and connected with the dropper slide H' of the hopper which latter may be of any well known form and adapted to operate in the usual way.

The handles and pole or tongue are braced in the usual or any desirable manner.

J are arms secured on the crank axle near the ends thereof, and to the rear ends of these arms are secured the wings K as shown. These wings may assume any suitable shape, but are preferably of the form shown and each is provided with a detachable lower part or acting portion K' which may be secured thereto in any suitable manner and which can be easily removed when it becomes broken, or for repairs, without removing the entire wing. The arms are fast upon the axle so as to turn therewith and to one side of the arm at its point of support on the axle there is a hub K provided with the set screws k' as shown to bear upon the axle and thus hold the arms in their adjusted positions; the arms can thus be made to slide on the axle to adjust the distance between the wings.

L is a lever pivoted at l between its ends on the pole or tongue, and its lower end is connected to the crank axle in any suitable manner, as by the arm L' as shown. M is an arm secured to the pole and provided with a plurality of holes m into any one of which a removable pin N may be engaged to hold the crank axle and consequently the wings in their adjusted position.

With the parts constructed and arranged substantially as above described the operation is as follows:—The fertilizer is placed in the hopper, the wings adjusted to the proper height and the endwise-movable shaft G is moved so that its end engages with the sprocket wheel d so that the shaft will be revolved with the said sprocket wheel and as the machine is moved along the dropper slide is caused to reciprocate in its bearings to drop the fertilizer, through the medium of the crank arm on the said endwise-movable shaft and intermediate connections above described. The depth at which the wings act can be readily regulated by the lever above described. When it is desired not to drop the material from the hopper the lever f attached to the shaft G is moved so as to disengage the same from the sprocket wheel and the latter will then revolve without giving motion to the shaft G as will be readily understood.

Modifications in detail may be resorted to without departing from the spirit of the invention or sacrificing any of its advantages.

What I claim as new is—

1. The combination with the dropper slide, of the endwise-movable shaft, pivotal connections between said shaft and the said slide, and a sprocket wheel with which said shaft is adapted to detachably engage, and the adjustable arms on the crank axle as set forth.

2. The combination with the crank axle and the arms adjustable thereon, of the wings mounted on the said arms, and detachable acting portions on said wings, as set forth.

3. The combination with the crank axle and the arms adjustable thereon, of the wings mounted on said arms, and the lever pivoted as described and connected with the said axle, substantially as and for the purpose specified.

4. The combination with the frame, the pole, the hopper, the hopper slide and the wheels, of the endwise-movable shaft, the two sprocket wheels, the sprocket chain, the crank axle, the arms on the axle and the wings thereon and the means for adjusting the arms, substantially as specified.

In testimony whereof I affix my signature in presence of two witnesses.

FRED M. HAINES.

Witnesses:
JOHN B. TRAFTON,
WALTER ACHOND.